United States Patent
Lo

(10) Patent No.: US 8,419,580 B2
(45) Date of Patent: Apr. 16, 2013

(54) ELECTRIC WHEEL FOR ELECTRIC VEHICLES

(76) Inventor: Chiu-Hsiang Lo, Taichung County (TW)

( * ) Notice: Subject to any disclaimer, the term of this patent is extended or adjusted under 35 U.S.C. 154(b) by 309 days.

(21) Appl. No.: 12/896,136

(22) Filed: Oct. 1, 2010

(65) Prior Publication Data

US 2012/0080934 A1    Apr. 5, 2012

(51) Int. Cl.
   *F16H 48/06*    (2006.01)
   *F16H 48/30*    (2012.01)
   *B60K 1/00*    (2006.01)

(52) U.S. Cl.
   USPC ............ 475/150; 475/149; 475/5; 477/7; 180/65.51; 180/65.6; 701/22

(58) Field of Classification Search ............ 475/149
   See application file for complete search history.

(56) References Cited

U.S. PATENT DOCUMENTS 5,242,335 A * 9/1993 Kutter .................... 475/4
5,771,988 A * 6/1998 Kikutani et al. .......... 180/65.51
2005/0264112 A1 * 12/2005 Tanaka et al. ............ 310/75 C
2007/0187952 A1 * 8/2007 Perlo et al. ............... 290/1 R
2012/0083375 A1 * 4/2012 Lo .......................... 475/149
2012/0150377 A1 * 6/2012 Buchheim et al. ........ 701/22

FOREIGN PATENT DOCUMENTS

JP    2004-156969    * 5/2004    ............ 475/149

* cited by examiner

Primary Examiner — David D Le
Assistant Examiner — Colby M Hansen

(57) ABSTRACT

An electric wheel for electric vehicles includes a rim, connecting members, a hub motor, a battery, and a control device. The connecting members are connected to an inside of the rim and the hub motor is connected to the connecting members. The hub motor includes a shaft, a rotor and a stator. The shaft is located on a central axis of the rim and two ends of the shaft are fixed to a vehicle frame. The battery is located on the rim and the control device receives a wireless command signal and generating a control signal to control the battery to provide power to the hub motor, and to allow the hub motor to operate. The rim is equipped with the battery and the hub motor and directly connected to the vehicle frame without wires connected to the vehicle frame.

4 Claims, 9 Drawing Sheets

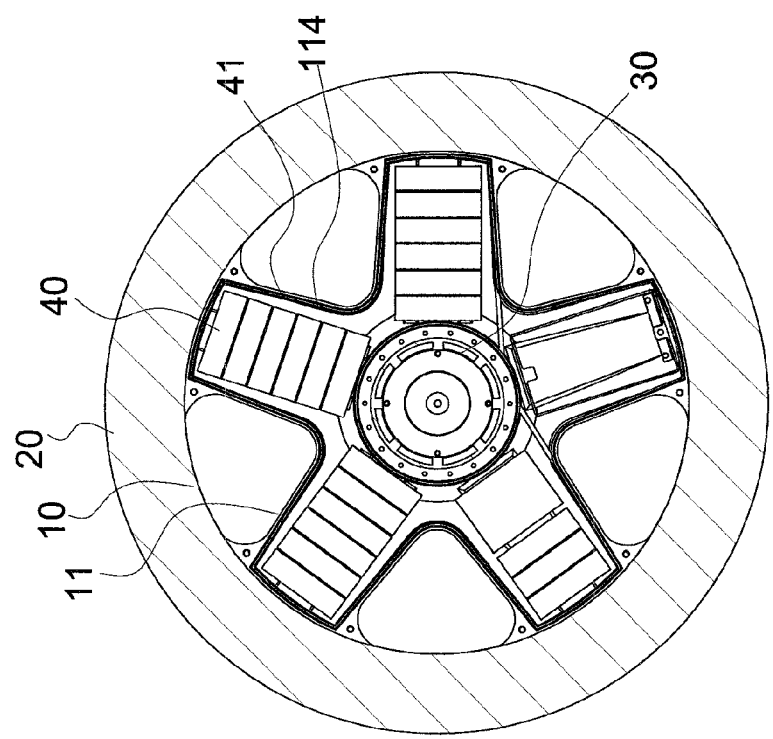
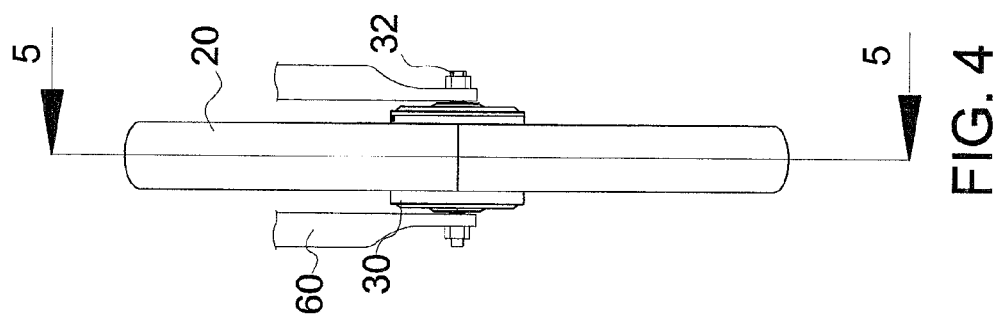

ELECTRIC WHEEL FOR ELECTRIC VEHICLES

FIELD OF THE INVENTION

The present invention relates to an electric wheel for electric vehicles, and more particularly, to a wheel equipped with battery and hub motor and the wheel is directly connected to the vehicle without wires extending from the vehicle frame.

BACKGROUND OF THE INVENTION

There are different types of driving mechanisms for electric vehicles and the hub motors are developed to improve the shortcomings of the conventional driving mechanism which require long transmission system and are not suitable for electric wheeled chairs and electric bicycles. The conventional hub motors are disclosed in U.S. Pat. Nos. 3,897,843, 4,346,777, 4,913,258, 5,450,915, 5,465,802, 5,600,191, 6,321,863, and 7,719,412, and applicant owned U.S. Pat. No. 6,974,399. All of the disclosures relate to the use of electric motor directly driving the wheels.

Most of the conventional wheels of the electric vehicles include a hub motor only and the battery for providing power to the hub motor is installed to the vehicle frame. In other words, the battery and the hub motor are separately connected to the frame and the wheel. In order to provide power to the hub motor from the battery, the coil unit is fixed to the shaft of the wheel and a hole is drilled from the periphery of the shaft so that the hole extends axially along the shaft. The wires are electrically connected between the coil unit and the battery via the hole. The battery is usually bulky and heavy so that the battery has to be connected to the strong portion of the frame such as the seat tube or the carriage rack. Therefore, the wires have to extend a long distance along the frame and this obviously cannot achieve the aesthetic purpose and requires a significant time to position the wires. In addition, the hole in the shaft may weaken the structure of the shaft.

Some wheels are equipped with power generating members which operate only when the wheels rotate and are not designed for directly providing electric power to the rotation of the wheels. In other words, when the wheels are stationary or the vehicles brake, the kinetic energy is transferred into electric power is stored in the battery attached to the vehicle frame.

The conventional hub motors are complicated and do not have battery directly equipped on the rim. The time required to set the wires and the exposed wires affect the aesthetic purpose of the vehicles. The present invention intends to provide an electric wheel to improve the shortcomings of the conventional wheels.

SUMMARY OF THE INVENTION

The first object of the present invention is to provide an electric wheel for electric vehicles and the electric wheel is equipped with the battery and the hub motor and can be directly connected to the vehicle frame without extra wires connected to the vehicle frame so as to have an aesthetic outer appearance for the vehicle. The electric wheel includes a rim having multiple connecting members connected to an inside of the rim. A hub motor is located at the center of the rim and includes a shaft, a rotor and a stator. The shaft has two ends thereof fixed to a vehicle frame and a battery and a control device are connected to the rim. The control device receives a wireless command signal and generates a control signal to control the battery to provide power to the hub motor.

The second object of the present invention is to provide an electric wheel with highly structural strength and includes a battery fixed to the connecting member of the rim and located outside of the hub motor. The wires for the battery and the coil unit do not extend through the shaft and are directly connected between the battery and the hub motor. The shaft does not need to be drilled so as to have better structural strength.

The third object of the present invention is to provide an electric wheel with sufficient electric power and includes multiple boxes and each box receives multiple batteries. The boxes are connected to the connecting members and extend along radial direction of the rim.

The fourth object of the present invention is to provide an electric wheel wherein each connecting member is a board-like connecting member and respective second ends of the connecting member are connected to each other to form a star-shaped arrangement. A recess is defined in a surface of each connecting member and a box is engaged with the recess. At least one battery is located in the recess. A star-shaped cover is connected to the connecting members to seal the recesses and positions the motor housing.

The fifth object of the present invention is to provide an electric wheel with power supply, wherein the stator includes a tube and the shaft extends through the stator which is rotatable the shaft. A magnet unit is mounted to the tube. The rotor includes a coil unit which is fixed to an inside of a motor housing and located around the magnet unit. A sun gear is connected to the first end of the tube. A gear ring is fixed to the motor housing. The shaft has a planet gear frame connected thereto which is connected with multiple planet gears. The planet gears are engaged with the sun gear and the gear ring.

The sixth object of the present invention is to provide an electric wheel for easily installed to electric vehicles, wherein the motor housing has a closed portion at a first end thereof and an opening is defined in a second end of the motor housing. The closed portion has a passage and two bearings are co-axially connected to the passage. One of the two bearings is mounted to the shaft and the other one of the two bearings is mounted to the tube. A cap is mounted to the opening and a bearing is connected to the cap. The bearing is mounted to the shaft. A separation board is located in the motor housing. The separation board and the closed portion define a first chamber, and the separation board and the cap define a second chamber. The sun gear, the planet gear frame, the planet gears and the gear ring are received in the first chamber. The rotor and the stator are received in the second chamber. The shaft includes a first rod and a second rod which is connected to the first rod. The first rod extends through the tube and the planet gear frame is mounted to the second rod. The bearing on the cap is mounted to the second rod.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 4 is a front view of the electric wheel of the present invention;

FIG. 5 is a cross-sectional view taken along line 5-5 of FIG. 4;

DETAILED DESCRIPTION OF THE PREFERRED EMBODIMENT

Figure 1:
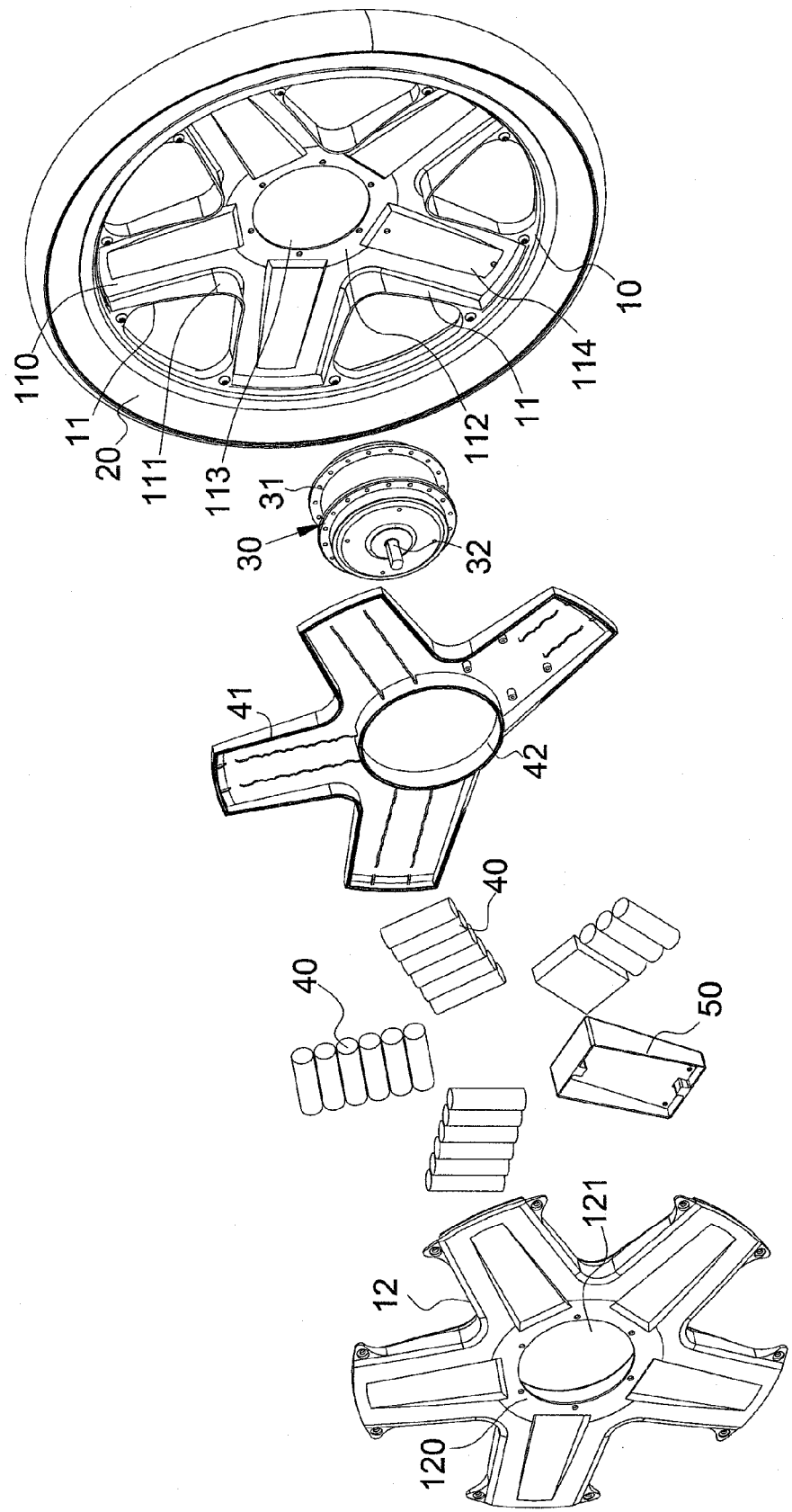
FIG. 1 is an exploded view to show the rim and the hub motor of the present invention.
Figure 2:
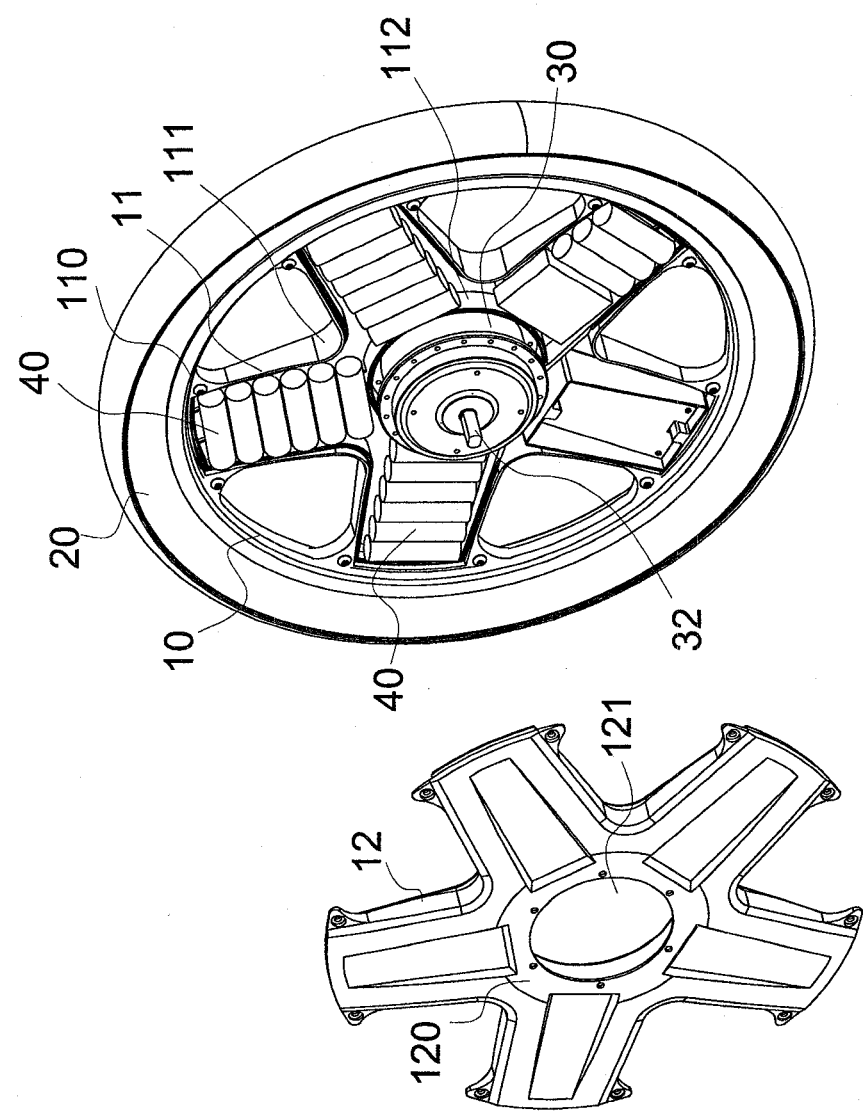
FIG. 2 is a perspective view to show the rim and the assembled hub motor of the present invention.
Figure 3:
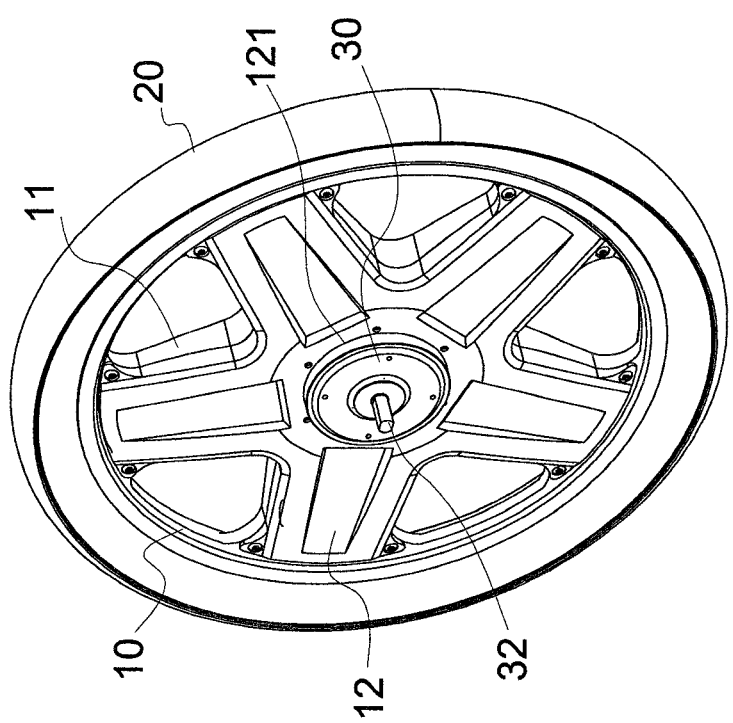
FIG. 3 is a perspective view to show electric wheel composed of the rim and the hub motor of the present invention.
Figure 6:
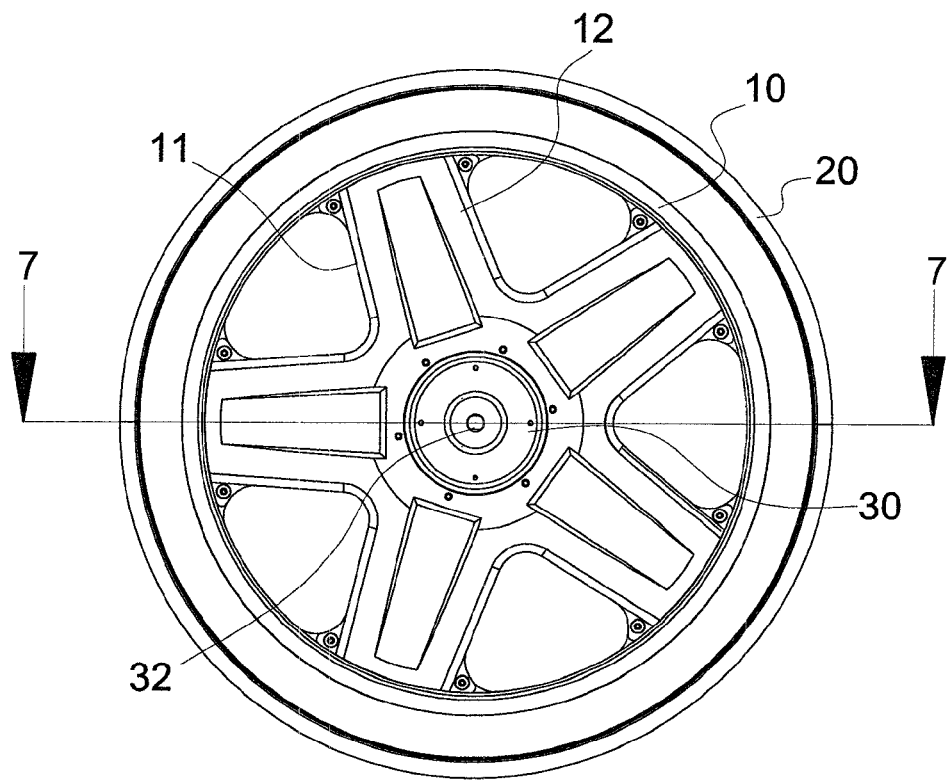
FIG. 6 is a side view of the electric wheel of the present invention.
Figure 7:
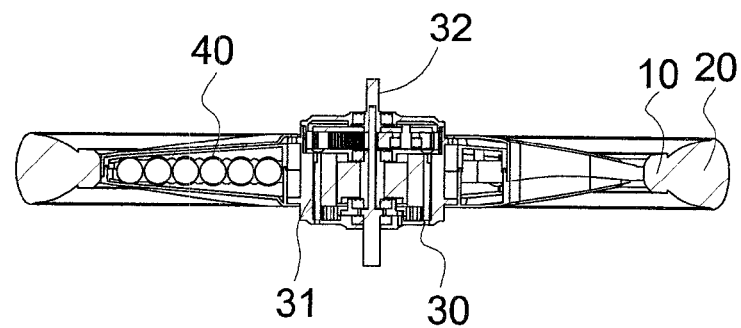
FIG. 7 is a cross-sectional view taken along line 7-7 of FIG. 6.

To achieve the first purpose of the present invention, referring to FIGS. 1~8, the electric wheel of the present invention comprises a rim 10 having a tire 20 connected to an outer periphery thereof and multiple connecting members 11 are connected to an inside of the rim 10. Each connecting member 11 has a first end 110 and a second end 111 which is located in opposite to the first end 110. The respective second ends 111 of the connecting members 11 extend toward the center of the rim 10 and form a star-shaped portion in radial direction of the rim 10.

A hub motor 30 has a cylindrical motor housing 31 and a shaft 32 extends through the central axis of the motor housing 31. A rotor 33 and a stator 34 are respectively mounted to the motor housing 31 and the shaft 32. The rotor 33 has a coil unit 330 mounted thereto and the stator 34 has a magnet unit 340 connected thereto. The motor housing 31 is fixed to the center of the rim 10 and two ends of the shaft 32 are fixed to the vehicle frame 60.

At least one battery 40 is fixed to the rim 10 so as to provide power to the hub motor 30.

A control device 50 is fixed to the rim 10 and receives a wireless command signal and generates a control signal to control the at least one battery 40 to provide power to the hub motor 30, and to allow the rotor 33 to rotate about the stator 34 and to allow the rim 10 to rotate about the shaft 32.

Figure 8:
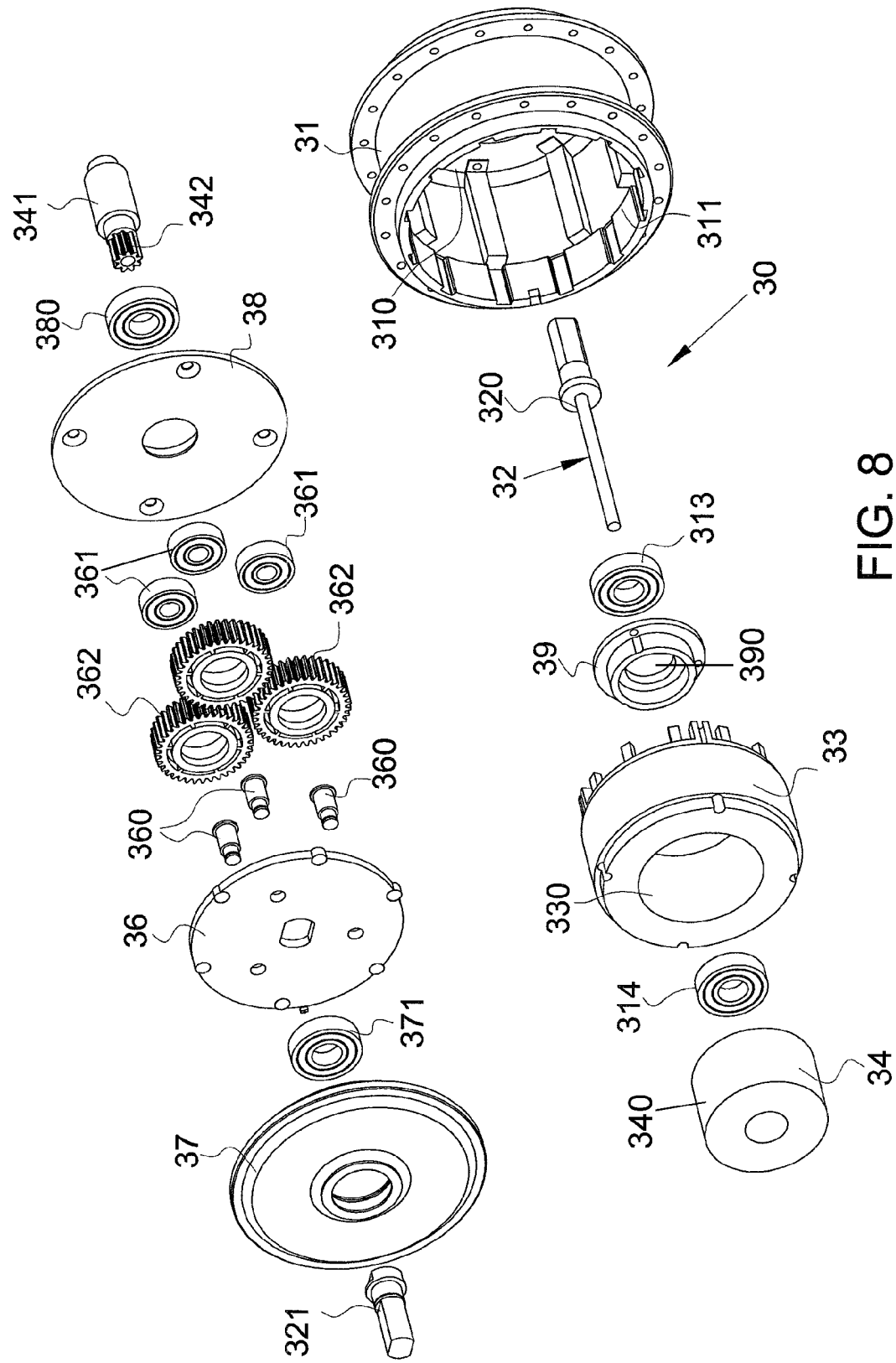
FIG. 8 is an exploded view of the hub motor of the present invention.
Figure 9:
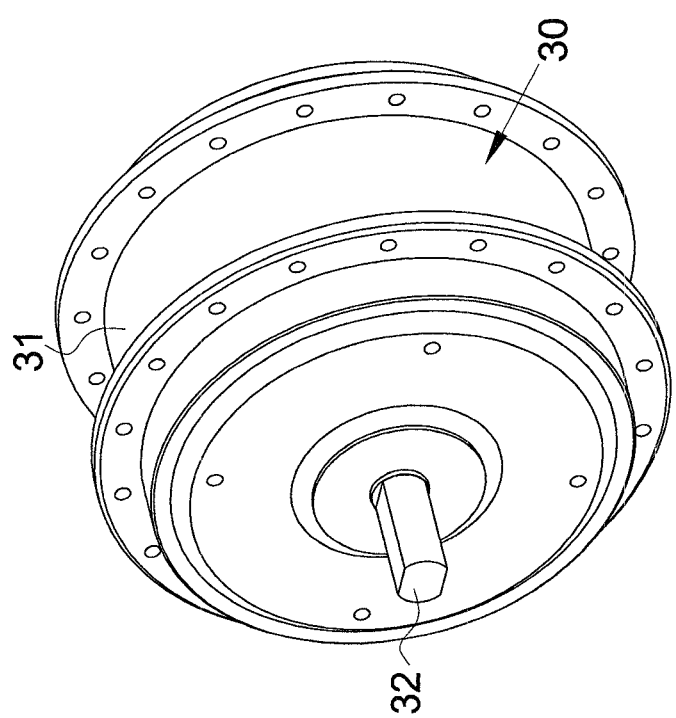
FIG. 9 is a perspective view of the hub motor of the present invention.
Figure 10:
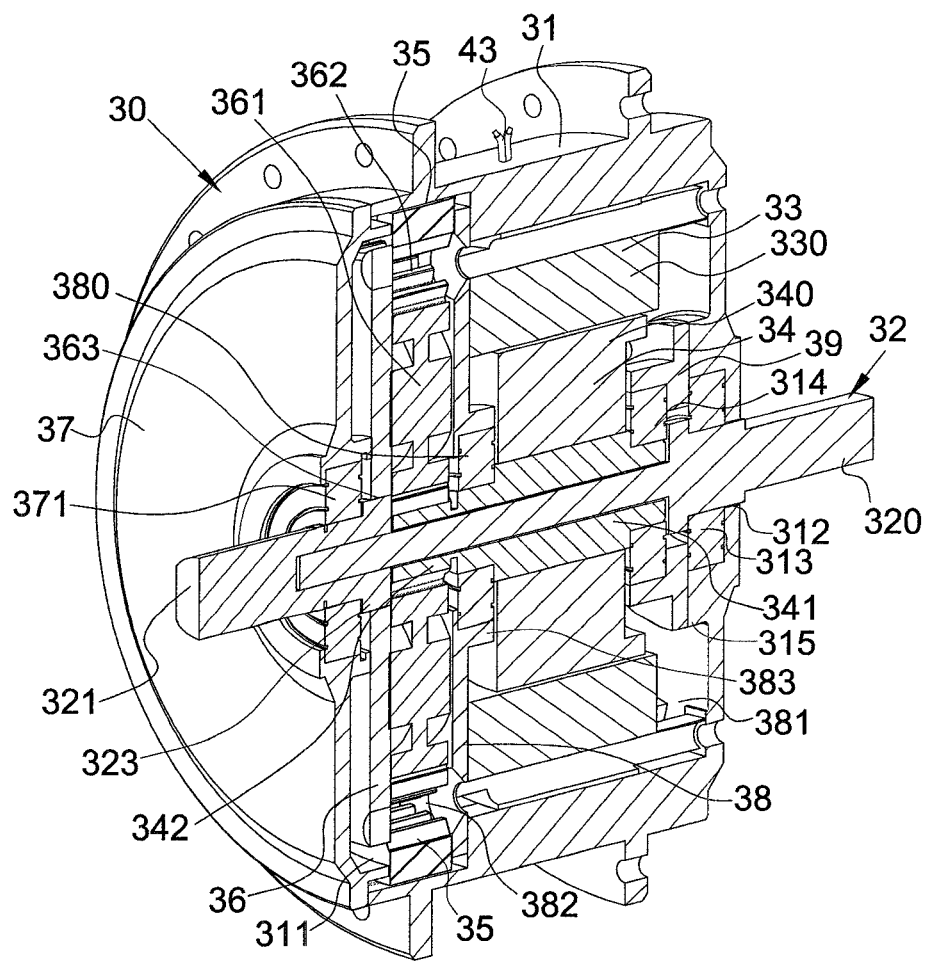
FIG. 10 is a partial cross sectional of the hub motor of the present invention.
Figure 11:
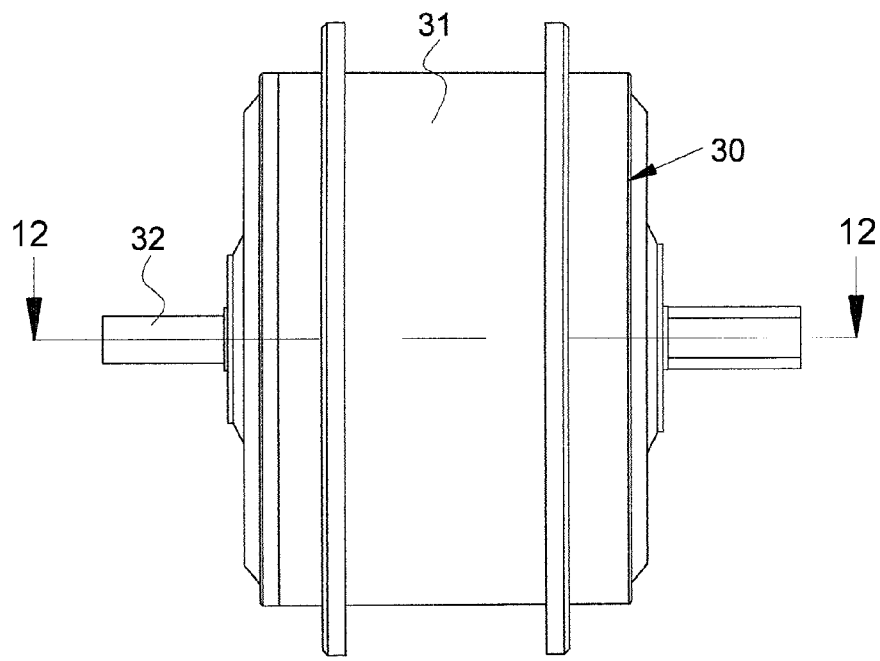
FIG. 11 shows the front view of the hub motor of the present invention.
Figure 12:
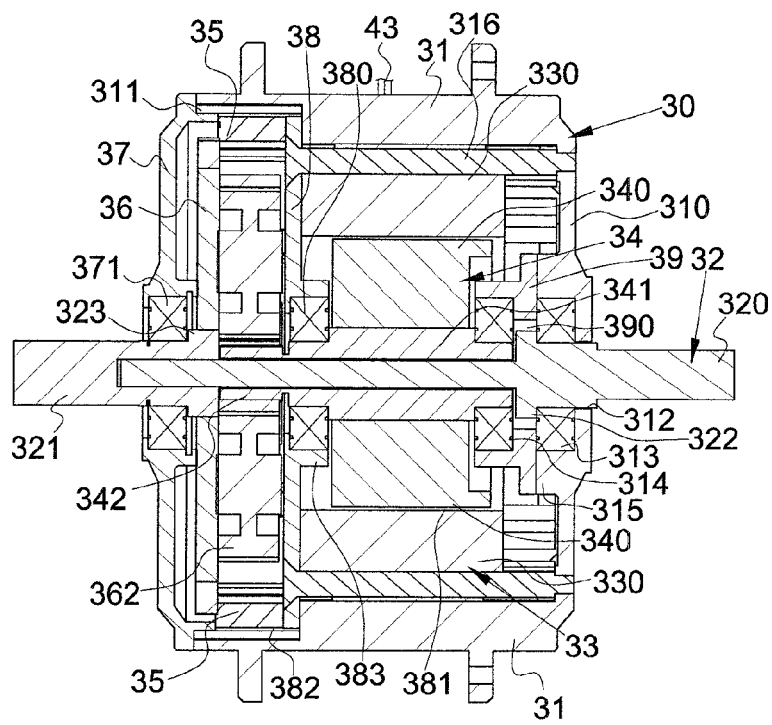
FIG. 12 is a cross-sectional view taken along line 12-12 of FIG. 11.

To achieve the second purpose of the present invention, referring to FIGS. 1, 8 and 12, the electric wheel of the present invention comprises a rim 10, multiple connecting members 11, a hub motor 30, at least one battery 40 and a control device 50. The at least one battery 40 is fixed to the connecting members of the rim 10 and located outside of the hub motor 30. The wires 43 connected between the at least one battery 40 and the coil unit 330 do not extend through the shaft 32, and are directly connected between the at least one battery 40 and the coil unit 330. As shown, the wires extend through the motor housing 31. The shaft 32 does not have any hole drilled therethrough so as to increase its structural strength.

To achieve the third purpose of the present invention, referring to FIGS. 1 and 8, the electric wheel of the present invention comprises a rim 10, multiple connecting members 11, a hub motor 30, at least one battery 40 and a control device 50. The at least one battery 40 includes multiple batteries 40 and are cooperated with multiple boxes 41. Each box 41 accommodates multiple batteries 40. The boxes 41 are connected to the connecting members 11 which are located in radial direction of the rim 10.

To achieve the fourth purpose of the present invention, referring to FIGS. 1 and 8, the electric wheel of the present invention comprises a rim 10, multiple connecting members 11, a hub motor 30, at least one battery 40 and a control device 50. There are multiple boxes 41. The connecting members 11 each is a board-like member and the respective second ends 111 of the connecting members 11 are connected to each other to form a first fixing portion 112 which is a star-shaped portion and extend in radial direction of the rim 10. The first fixing portion 112 positions the motor housing 31. The hub motor 30 has a first hole 113 in a center thereof and the shaft 32 extends through the first hole 113. Each connecting member 11 has a recess 114 defined in a surface thereof and the box 41 is received in the recess 114. Each box 41 receives at least one battery 40.

As shown in FIG. 1, the boxes 41 are connected to each other to form as a star-shaped combination and a circular hole 42 is defined in a center of the star-shaped combination. The hub motor 30 extends through the circular hole 42. The multiple batteries 40 are arranged in radial direction of the rim 10. A star-shaped cover 12 is connected to the inside of the rim 10 and connected to the connecting members 11 so as to seal the recesses 114. The cover 12 has a second fixing portion 120 at a center thereof and the motor housing 31 is fixed to the second fixing portion 120. The second fixing portion 120 has a second hole 121 defined centrally therethrough and the shaft 32 extends through second hole 121.

To achieve the fifth purpose of the present invention, referring to FIGS. 1, 8 and 10~12, the electric wheel of the present invention comprises a rim 10, multiple connecting members 11, a hub motor 30, at least one battery 40 and a control device 50. The stator 34 includes a tube 341 and a magnet unit 340. The tube 341 is rotatably mounted to the shaft 32 and the magnet unit 340 is fixed to an outside of a mediate portion of the tube 341. The rotor 33 includes a coil unit 330 which is fixed to the inside of the motor housing 31 and located around the magnet unit 340. The coil unit 330 is not in contact with the magnet unit 340. A sun gear 342 is connected to the first end of the tube 341. A gear ring 35 is fixed to the motor housing 31. The shaft 32 has a planet gear frame 36 connected thereto which is connected with multiple planet gears 362 by multiple pivots 360 and bearings 361. The planet gears 362 are located around the sun gear 342 at even central angle. The planet gears 362 are located in side of the gear ring 35 and engaged with the sun gear 342 and the gear ring 35. The rotor 33 has the coil unit 330 and is fixed to the motor housing 31 which is integrally connected to the rim 10. The rim 10 has batteries 40 connected thereto, and the batteries 40 and the coil unit 330 are co-rotatable with the rotation of the rim 10. Therefore, the wires 43 are directly connected to the batteries 40 and the hub motor 30, and both can be directly connected to the rim 10.

To achieve the sixth purpose of the present invention, referring to FIGS. 1 and 8~12, the electric wheel of the present invention comprises a rim 10, multiple connecting members 11, a hub motor 30, at least one battery 40 and a control device 50. The motor housing 31 has a closed portion 310 at a first end thereof and an opening 311 is defined in a second end of the motor housing 31. The closed portion 310 has a passage 312 defined centrally therethrough and two bearings 313, 314 are co-axially connected to the passage 312 in the closed portion 310. One of the two bearings 313 is mounted to the shaft 32 and the other one of the two bearings 314 is mounted to the tube 341. The closed portion 310 has a flange 315 located at the passage 312 and the flange 315 has a bearing cage 39. A bearing 313 is located within the flange 315 and the bearing 314 is connected to the bearing cage 39. A cap 37 is mounted to the opening 311 and a bearing 371 is connected to the cap 37. The bearing 371 is mounted to the shaft 32. A separation board 38 is located in the motor housing 31 and an annular flange 383 is connected to the separation board 38 so as to receive the bearing 380. The tube 341 extends through the bearing 380 and the shaft 32 extends through the tube 341. The separation board 38 and the closed portion 310 define a first chamber 381 therebetween, and the separation board 38 and the cap 37 define a second chamber 382 therebetween. The sun gear 342, the planet gear frame 36, the planet gears 362 and the gear ring 35 are received in the second chamber 382. The rotor 33 and the stator 34 are received in the first chamber 381. The shaft 32 includes a first rod 320 and a second rod 321 which is connected to the first rod 320. The first rod 320 extends through the tube 341 and the planet gear frame 36 is mounted to the second rod 321. The bearing 371 on the cap 37 is mounted to the second rod 321. Bolts 316 are connected between the separation board 38 and the closed portion 310, and the coil unit 33 is fixed by the bolts 316.

There are several advantages of the present invention and which are:

1. The electric wheel of the electric vehicle is equipped with the power supply to obtain a complete and integral structure, and can be easily installed to the electric vehicles. There will be no messy wires and control cables located on the vehicle frame.

2. The batteries 40 are fixed to the connecting members 11 of the rim 10 and located around the hub motor 30. The wires 43 of the batteries 40 and the coil unit 33 do not pass through the shaft 32 and directly extend through the motor housing 31. Therefore the shaft 32 does not need to be drilled and the structural strength is reinforced.

3. The present invention has multiple batteries 40 and boxes 41 which are fixed to the connecting members 11 and located in radial direction of the rim 10. The batteries 40 provide sufficient electric power to the hub motor 30.

4. Each connecting member 11 is a board-like connecting member and has a recess 114 for receiving the box 41 in which the batteries 40 are received. The star-shaped cover 12 is used to cover all of the recesses 114 and position the motor housing 31 to simply the steps of assembling.

5. The present invention has a simple structure including the rim 10, the batteries 40 and the hub motor 30, so that the present invention can easily connected to the electric vehicles.

6. The motor housing 31 of the hub motor 30 includes the closed portion 310 and the opening 311. The opening 311 is covered by the cap 37 and the separation board 38 is located in the motor housing 31 so as to accommodate the sun gear 342, planet gear frame 36, the planet gears 362, the gear ring 35, the rotor and the stator. The shaft 32 is composed of the first rod 320 and the second rod 321, both of which are pivotably connected to the components mentioned above. The assembly is easy and systematical.

While we have shown and described the embodiment in accordance with the present invention, it should be clear to those skilled in the art that further embodiments may be made without departing from the scope of the present invention.

What is claimed is:

1. An electric wheel for electric vehicles, comprising:
a rim (10) having a tire (20) connected to an outer periphery thereof and multiple connecting member (11) connected to an inside of the rim (10); each of the multiple connecting member (11) being board-like member and having a first end (110) being fixed to the inside of the rim (10), and a second end (111) extending toward a center of the rim (10) and connecting to each other to form a first fixing portion (112) which is a star-shaped portion; and
a hub motor (30) located at the center of the rim (10) and having a shaft (32), a rotor (33) and a stator (34), the shaft (32) located on an central axis of the rim (10) and two ends of the shaft (32) adapted to be fixed to a vehicle frame (60), the rim (10) having multiple batteries (40) and a control device (50) connected thereto, the control device (50) receiving a wireless command signal and generating a control signal to control the battery (40) to provide power to the hub motor (30), and to allow the rotor (33) to rotate about the stator (34) and to allow the rim (10) to rotate about the shaft (32);
wherein the multiple batteries being connected to multiple boxes respectively, each box (41) having multiple batteries (40) received therein, each box (41) being fixed to one connecting member (11) of the rim (10) and located outside of the hub motor (30), each connecting member (11) having a recess (114) defined in a surface thereof and the box (41) being received in the recess (114); the boxes (41) being connected to each other to form as a star-shaped combination and a circular hole (42) being defined in a center of the star-shaped combination, the hub motor (30) extending through the circular hole (42), the boxes (41) being located in radial directions of the rim (10) respectively.

2. The electric wheel as claimed in claim 1, wherein wires electrically connected between the hub motor (30) and the batteries (40), the wires do not extend into the shaft (32) and are directly connected between the batteries (40) and the hub motor (30).

3. The electric wheel as claimed in claim 1, wherein the first fixing portion (112) positions the hub motor (30) and has a first hole (113) in a center thereof, the shaft (32) extends through the first hole (113).

4. The electric wheel as claimed in claim 1, wherein a star-shaped cover (12) is connected to the inside of the rim (10) and connected to the connecting members (11) so as to seal the recesses (114), the cover (12) has a second fixing portion (120) at a center thereof and the hub motor (30) is fixed to the second fixing portion (120), the second fixing portion (120) has a second hole (121) defined centrally therethrough and the shaft (32) extends through second hole (121).

* * * * *